G. H. GILLETTE.
TIRE.
APPLICATION FILED APR. 9, 1909.

929,418.

Patented July 27, 1909.

UNITED STATES PATENT OFFICE.

GEORGE H. GILLETTE, OF NEW YORK, N. Y.

TIRE.

No. 929,418. Specification of Letters Patent. Patented July 27, 1909.

Application filed April 9, 1909. Serial No. 488,823.

*To all whom it may concern:*

Be it known that I, GEORGE H. GILLETTE, a citizen of the United States, residing at New York, in the county of New York and State of New York, have invented certain new and useful Improvements in Tires, of which the following is a specification.

This invention relates to tires, and it relates particularly to that class of these articles which are designed for use on automobiles and similar vehicles.

The object of the invention is to provide a tire of the character referred to which shall be simple and comparatively cheap in construction and which shall possess all the advantages and none of the defects of the pneumatic or cushion tires in common use.

With this object in view the invention consists essentially of a tire having an outer covering or tread of any suitable material or combinations of materials, and a core having a projecting spiral rib extending around the core.

Figure 1:
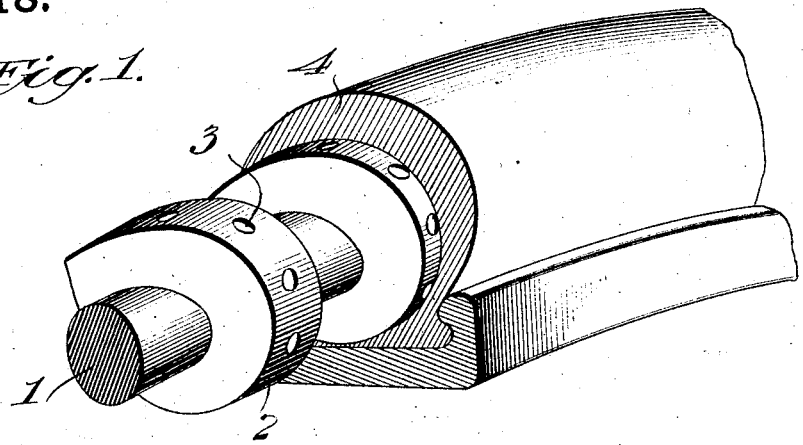
Figure 2:
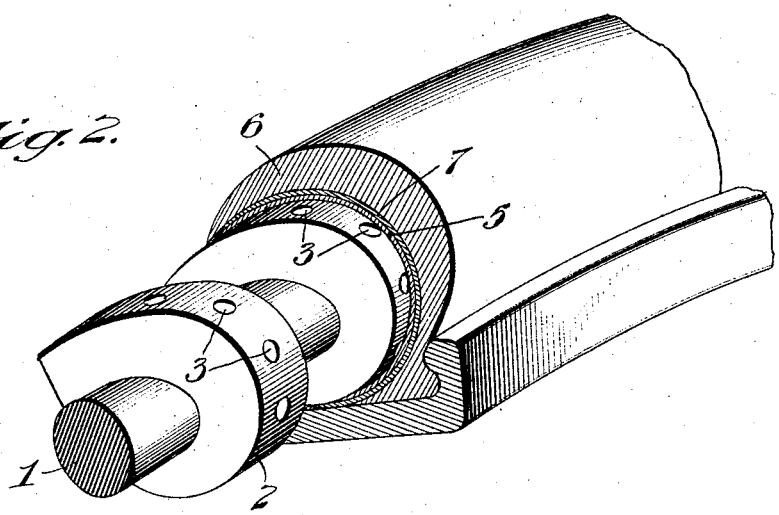
Figure 3:
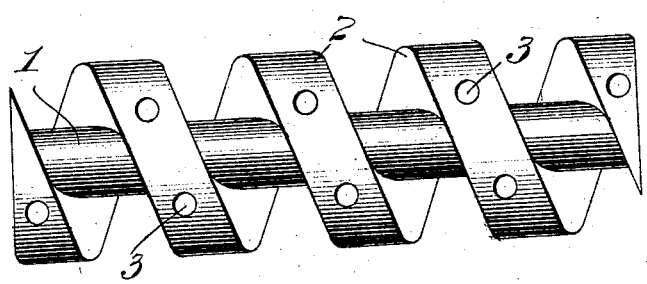

The invention is illustrated in the accompanying drawing, in which;

Figure 1 is a perspective view of a portion of a tire made in accordance with my invention showing in section the arrangement of the core within a covering or tread; Fig. 2 is a view similar to Fig. 1 showing my core applied to an inner tube introduced into a covering of different construction than that shown in Fig. 1, and Fig. 3 is a fragmentary view showing the form of the improved core.

In this drawing 1 represents the body of the core which may be made in straight pieces adapted to be cut into required lengths, be bent into circular form, and have their ends connected by cement or otherwise, or which may be molded in circular form of the required diameter to be inclosed by the cover in connection with which they are to be used. The body 1 of the core has projecting therefrom a spiral rib 2 which may be made in a separate piece and of different material than the body 1 and attached thereto. I prefer however to make the parts integra and of the same material thus allowing their being made in one operation as by molding. The rib may be of any desired height, the preferred form being substantially as shown in the drawing wherein the rib projects from the core a distance approximately corresponding to the diameter of the body 1. The pitch of the spiral of the rib may be varied to adapt the tire of which the core forms a part to use on vehicles of varying weights. When made for use on vehicles of medium weight the spaces between the convolutions are substantially the same as the width of the outer face of the rib. For use on heavier vehicles the spaces between the convolutions may be less, or the outer face of the rib may be made wider and the same or a less space be left between the convolutions. The outer face of the rib is preferably provided with indentations 3 placed at equal distances apart throughout the length of the rib. The core body and rib whether formed in one operation or made separately and connected are of some durable elastic material, caoutchouc either alone or combined with other substances being preferably employed. The core of the form described may be used in connection with an outer tube or covering of any suitable form or material. For instance as shown in Fig. 1 it may be inclosed by a tube 4 of rubber having a smooth inner face and having a protected tread. Again, it may be inclosed in an inner tube 5 which fits closely to the rib, and the tube may in turn be inclosed by an outer tube 6 formed with an outer face of rubber having an inner strengthening layer 7 of heavy canvas against which the inner tube bears.

In the use of tires having my core arranged therein the entire weight of the vehicle to which the tires are applied comes upon the spiral rib, and as this by reasons of its form and of the material of which it is made, is yielding in all directions and at the same time forms a continuous bearing surface, shocks or jars to the tires are absorbed by the core and thus are prevented from being transferred to the occupants of the vehicle.

In any arrangement of the core within a tire the rib is preferably held by a covering closely confining the core and having a smooth surface against which the rib abuts. Thus as the rib is depressed more or less of the air is forced from the indentations forming a partial vacuum in them and causing the rib to adhere closely to its covering thereby preventing displacement of the rib in reference to other parts of the tire.

Having thus described my invention, what I claim as new, and desire to secure by Letters Patent, is:—

1. A core for tires having an integral spiral rib extending from its outer face, substantially as described.

2. A core for tires composed of resilient material and having an integral spiral rib extending from its outer face, substantially as described.

3. A core for tires having a spiral rib provided with indentations extending from its outer face, substantially as described.

4. A tire comprising a core having a spiral rib provided with indentations, and a covering closely inclosing the core, substantially as described.

In testimony whereof I affix my signature in presence of two witnesses.

GEORGE H. GILLETTE.

Witnesses:
 D. C. WHEARTY,
 LEON L. GURNBINER.